US006415048B1

(12) United States Patent
Schneider (10) Patent No.: US 6,415,048 B1
(45) Date of Patent: *Jul. 2, 2002

(54) COMPOSITIONAL ANALYSIS SYSTEM

(75) Inventor: Michael Bret Schneider, Portola Valley, CA (US)

(73) Assignee: Schneider Medical Technologies, Inc., Westlake Village, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/418,986

(22) Filed: Apr. 7, 1995

Related U.S. Application Data (63) Continuation-in-part of application No. 08/379,228, filed on Jan. 27, 1995, now abandoned, which is a continuation-in-part of application No. 08/135,201, filed on Oct. 12, 1993, now abandoned.

(51) Int. Cl.[7] .................................................. G06K 9/00
(52) U.S. Cl. ............................. 382/131; 382/128; 378/4; 378/20
(58) Field of Search ................................ 382/128, 130, 382/151, 155, 203, 206, 218, 131, 132, 154; 378/19, 20, 4, 901

(56) References Cited

U.S. PATENT DOCUMENTS

| | | | |
|---|---|---|---|
| 4,202,968 A | 5/1980 | Tamara et al. | |
| 4,495,181 A | 1/1985 | Norman et al. | |
| 4,524,017 A | 6/1985 | Inoue et al. | |
| 4,703,270 A | 10/1987 | Hall et al. | |
| 4,783,826 A | 11/1988 | Koso ........................... | 382/195 |
| 4,866,983 A | 9/1989 | Vinegar et al. | |
| 4,899,392 A | 2/1990 | Merton | |
| 4,991,224 A * | 2/1991 | Takahashi ................... | 382/154 |
| 5,000,800 A | 3/1991 | Sagawa | |
| 5,003,616 A | 3/1991 | Orita et al. | |
| 5,047,930 A | 9/1991 | Martens et al. | |
| 5,048,109 A | 9/1991 | Bloomberg et al. | |
| 5,056,146 A * | 10/1991 | Nishide ....................... | 382/131 |
| 5,131,053 A | 7/1992 | Bernzott et al. | |
| 5,133,020 A | 7/1992 | Giger et al. ................. | 382/128 |
| 5,185,809 A * | 2/1993 | Kennedy ..................... | 382/131 |
| 5,201,011 A | 4/1993 | Bloomberg et al. | |
| 5,239,591 A * | 8/1993 | Ranganath ................... | 382/128 |
| 5,273,040 A * | 12/1993 | Apicella ...................... | 382/130 |
| 5,319,551 A * | 6/1994 | Sekiguchi .................... | 382/131 |
| 5,320,162 A * | 6/1994 | Paul et al. ................. | 128/653.2 |
| 5,331,550 A | 7/1994 | Stafford et al. ............. | 382/209 |
| 5,359,513 A | 10/1994 | Kano et al. ................. | 382/130 |
| 5,410,250 A * | 4/1995 | Brown ........................ | 382/128 |
| 5,421,331 A * | 6/1995 | Devito ........................ | 382/128 |
| 5,425,368 A * | 6/1995 | Brandt ........................ | 382/128 |
| 5,431,161 A * | 7/1995 | Ryals .......................... | 382/131 |
| 5,435,310 A * | 7/1995 | Sheehan ...................... | 382/128 |
| 5,442,672 A * | 8/1995 | Bjorkholm ..................... | 378/4 |
| 5,490,221 A | 2/1996 | Ranstard et al. ............. | 382/130 |

OTHER PUBLICATIONS

Wahle, A. et al., "3D Reconstruction on Bi-plane Angiograms of Coronary Arteries in Pediatric Cardiology", IEEE, 1992, pp. 19–22.

Magnetic Cybernetics, sales brochure entitled "Image-Pro PI US" published 1992.

(List continued on next page.)

Primary Examiner—Matthew C. Bella
(74) Attorney, Agent, or Firm—Ritter, Lang & Kaplan LLP

(57) ABSTRACT

An improved method of data and image analysis has been described with reference to specific embodiments. The present invention identifies specific portions of a data file and provides the capability of mathematically comparing those portions with other portions. In one embodiment of the present invention, the user is given the option of reformatting the data file. The user is further given the option of having the processor interpret the result of the analysis step.

15 Claims, 7 Drawing Sheets

OTHER PUBLICATIONS

Jandel Scientific, sales brochure entitled "MOCHA Image Analysis Software, published 1992.

Data Translation, Inc., sales brochure entitled "Global Lab Image, Version 2.0", published 1992.

Automatics, seminar brochure entitled "A Seminar on Machine Vision & Image Analysis," published 1992.

Shortliffe et al., "Knowledge Engineering for Medical Decision Making: A Review of Computer–Based Clinical Decision Aids," *Proceedings of the IEEE*(1979) 67:1207–1224.

Heckerman et al., "Toward Normative Expert Systems: Part I–Pathfinder Project, " *Meth. Inform. Med.* (1992) 31:90–105.

Li et al., "Knowledge–Based Classification and Tissue Labeling of MR Images of Human Brain," *IEEE Transactions on Medical Imaging*(1993) 12:740–750.

Cimflex Teknowledge Corporation sales brochure (undated) "M.4: The Embeddable Expert System Solution".

Media Cybernetics sales brochure (1993) "HALO Advanced Imaging Library 1.0".

Kilday et al., "Classifying Mammographic Lesions Using Computerized Image Analysis," *IEEE Transactions on Medical Imaging*(1993) 12:664–669.

Lipkin, "A Face by any Other Name,"*Science News*(1994) 145:216–220.

Vries et al., Chapter 35, "Computerized Three–Dimensional Stereotactic Atlases,"*Modern Stereotactic Neurosurgery*, L. D. Lunsford (ed.), 1988, pp. 441–459.

Wolberg et al., "Computer–Designed Expert Systems for Breast Cytology Diagnosis," *Analytical and Quantitative Cytology and Histology*(1993) 15: 67–74.

Street, Toward Automated Cancer Diagnosis: An Interactive System for Cell Feature Extraction, *Computer Sciences Tech. Report #1052*, Univ. of Wisconsin–Madison, Oct. 1991.

Nakamori et al., "Effect of Heart–Size Parameters Computed from Digital Chest Radiographs on Dection of Cardiomegaly,"*Investigative Radiology*(1991) 26:546–550.

Winston, *Artificial Intelligence*, $3^{rd}$Ed., Addison–Wesley Publishing company, 1992, pp. 10–11 and 119–177.

Katsuragawa et al., "Image Feature Analysis and Computer–Aided Diagnosis in Digital Radiography: Effect of Digital Parameters on the Accuracy of Computerized Analysis of Interstitial Disease in Digital Chest Radiographs,"*Med. Phys.* (1990) 17:72–78.

Hudson et al., "Cumputer–Assisted Differential Diagnosis and Management,"*IEEE* (1991) pp. 218–226.

Ferrer–Roca et al., "Morphometric, Densitometric and Flow Cytometric Criteria for the Automated Classification of Thyroid Lesions," *Analytical and Quantitative Cytology and Histology*(1990) 12:48–55.

Bonadonna et al., "Visual Knowledge Processing in Computer–Assisted Radiology: A Consultation System,"*Med. Inform.* (1992) 17:19.

Ismail et al., "A Medical Pictorial Database System,"$2^{nd}$ Int. Conf. on automation, Robotics, & Computer Vision, Sep. 16–18, 1992, Nanyana Technol. Univ. 1992, pp. CV–17.7.1–17.7.5.

Grimm et al., "An Expert System for the Diagnosis of Thyroid Gland Diseases,"Proc., SHARE–Europue Spring Mtg. –Distributed Applications, Hamburg, Germany, Apr. 1–22, 1993, pp. 275–293.

Smith et al., "MURIM: Multi–Dimensional Reconstruction and Imaging in Medicine,"Advances in Medical informatics, IOS Press, Amsterdam, Netherlands, 1992, pp. 268–276.

* cited by examiner

COMPOSITIONAL ANALYSIS SYSTEM

This application is a continuation-in-part of U.S. Ser. No. 08/379,228, filed Jan. 27, 1995, now abandoned, which is a continuation-in-part of U.S. Ser. No. 08/135,201, filed Oct. 12, 1993, now abandoned.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates to the field of data analysis. In one specific embodiment the invention provides a method of identifying specific regions of an image and comparing each region with other identified regions, with an identified region of another image, or with the features of the same region retrieved from a database.

Often, it is desirable to be able to compare the data represented by two images of an object. For example, in medicine, it is often desirable to compare images of a brain with a suspected disease to images of healthy brains, or images of a diseased liver of a patient to normal livers. Furthermore, certain diagnostic and experimental procedures benefit from the comparison of images taken of the same patient and body part, but at different times, or under different conditions. This enables the physician to better diagnose a patient's condition.

The presently available methods of comparing images are generally limited to comparing the images in their entirety. For example, two images may be digitally subtracted in their entirety, and certain areas of interest can be visually identified prior to analysis. However, there are situations where it is desirable to compare a specific region of an image to another region of the same image or to a specific region of an other image. For example, a neurologist might wish to quantitatively compare the structure or activity level of a specific region in the left brain of a patient to a specific region of the patient's right brain. One might also wish to compare the activity level in a resting brain part to the same part's activity level when stimulated. The comparison of images by eye is inaccurate and imprecise, making automated methods desirable.

Therefore, from the above, it can be appreciated that an improved method and apparatus for image data analysis are desired.

SUMMARY OF THE INVENTION

In one embodiment of the method of the present invention, an input data file describing an object is generated. The input data file is segmented or divided into a number of sub-files, each representing an identified portion of the input data file. Next, each of the sub-files are compared with a reference file. The result of the computer step is interpreted using artificial intelligence techniques to form a conclusion or diagnosis. Finally, the conclusion is communicated to the user in graphical or textual format.

In another embodiment of the method of the present invention, the user is given the capability of formatting the input data file or interpreting the result of the comparing step. As a result, the present invention provides an apparatus and a method for analyzing and comparing any selected portion of a data file. The present invention further provides the capability of providing textual or graphical representations of the result of the analysis as well as diagnostic information.

Other objects of the present invention will become apparent as the following specification progresses, reference being had to the accompanying drawings for an illustration of the invention.

DETAILED DESCRIPTION OF THE PREFERRED EMBODIMENT

A. Definitions and Terminology

In the description of the present invention certain terms are used that warrant the following list of definitions.

Certain aspects of the present invention deal with digital images composed of pixels. The images could be black and white, greyscale, or color images of an object. The term "image" refers to a representation of a 2 or more dimensional data structure composed of pixels. It is either an actual image as conventionally defined in computer terminology, or data representing the spatial layout of structures or activities, whether or not it is visually presented.

Where the image is a black and white (i.e. binary) image, a given pixel is either "ON" or "OFF." Where the image is a color image, a given pixel is represented by a color. Where the image is a greyscale image, information about the object represented by the image is coded in the stepwise ascending/descending values of the shades of grey that lie between black and white.

Images are manipulated according to a number of operations wherein one or more source images are mapped onto a destination image. The results of such operations are generally referred to as images. The image that is the starting point for processing will sometimes be referred to as the original image.

The term "pixel" will be used interchangeably with the word "voxel" since a pixel on a computer screen usually represents at least some 3-dimensional data reflected in its greyscale or color map, as every "2-dimensional slice" really has a finite thickness.

The term "region" represents individual segments of an image data that is representative of a distinct process, event, part, object, place, or anatomical structure within the object being analyzed.

The term "identified region" refers to regions that have been classified as being substantially similar to a known region.

The term "identification" refers to the process of classifying a region.

The terms "file" and "sub-file" are used here to denote related sets of data. That data may or may not be stored together, and may or may not be stored at all. Sub-files may be derived from a file through the process of segmentation and/or classification. When an image is derived from one or more pre-existing images, for instance, the "file" or sub-file" that describes a new image may only be held in memory, or may primarily contain a set of pointers to appropriate locations in other files. The set of sub-files need not be physically separate data files. For example, a file may be symbolically divided into numerous sections, each section being labeled as a sub-file.

The term "image analysis" is used here to denote computer-based routines that are used to identify and derive information about specific regions represented in an image. For instance, such routines could be used to locate and identify a "one-half-inch bolt head" whenever one appeared in an image. Image analysis includes segmentation, classification, and obtaining information about the features or attributes of an image. Depending upon the algorithms and programs used, segmentation, classification, and attribute determinations may be separate steps or may be concurrently derived. Further, segmentation, classification, and attribute determinations may be performed on 2, 3, or more-dimensional images.

The term "extraction of a region" refers to the separation, symbolically or physically, of a portion of a region from another. Usually, in the context of the present invention, extraction is done symbolically by a process such as segmentation.

The term "features of a region" refers to the attributes or parameters of an identified region, such as pixel-volume, mean pixel intensity, or shape.

The term "object" is used to denote a structure being analyzed.

The term "universal" classification criteria refers to those criteria for describing an object which are applicable all data within a data set, i.e., a series of slices or a single 3-dimensional (3-D) matrix.

The term "slice-specific" classification criteria refers to those criteria for describing an object which are applicable to specific data within the data set, i.e., one slice in a series of slices.

B. Description of the Invention

Figure 1:
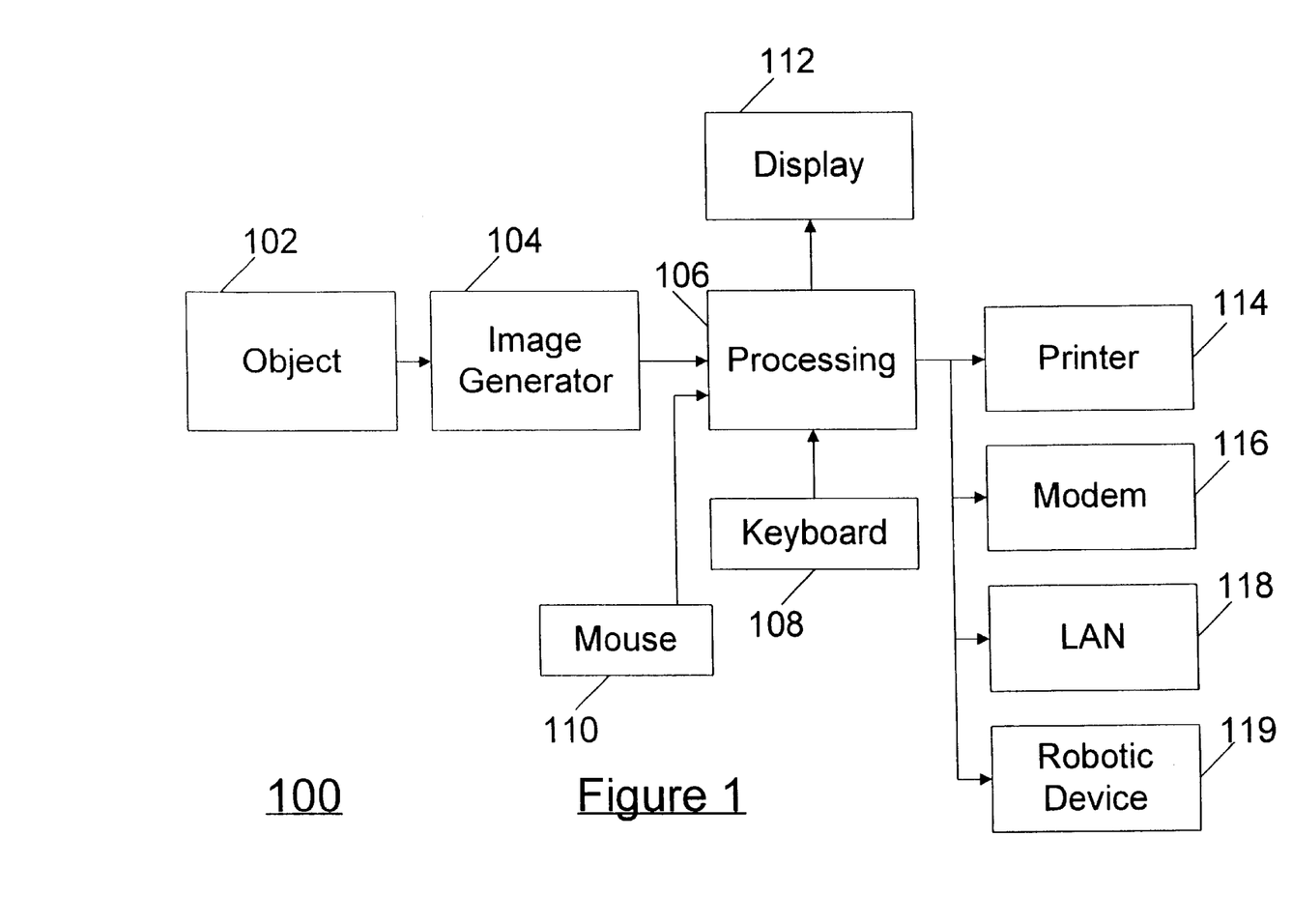
FIG. 1 illustrates a block diagram of the apparatus of the present invention.

FIG. 1 is a block diagram of one embodiment of a system according to the present invention. System 100 includes an image generator 104 that generates one or more images of object 102. Image generator 104 may capture the image of object 102 while it is directly exposed to image generator 104, or while object 102 is enclosed in an enclosure. Any image generator can be used with system 100. Typical image generators include Computerized Tomography ("CT"), Position Emission Tomography ("PET"), Magnetic Resonance Imaging ("MRI") systems, X-Ray systems, optical image generators, video cameras, CAD scans, etc. Some image generators such as Functional Magnetic Resonance Imaging ("FMRI") systems are capable of generating images that provide information about the activity level of an object. Images generated by these image generators often include structural information, as well as the "functional" activity information. Such images generators may produce images representative of entire 3-dimensional volumes or produce images representative of one or more "slices" of essentially 2-dimensional data.

The majority of the above image generators are capable of capturing the image in digital format. However, in cases where the generated image is in analog, i.e. continuous format, an analog to digital convertor (not shown) may be used to convert the analog image to a digital image. In the embodiment of FIG. 1, it is assumed that the image generator is capable of generating digital images.

The digital image is next received by processor 106. Each image is transferred to the processor 106 in a digital data file. Any type of computer, including laptop, desktop, workstation, or mainframe, can be used as processor 106. The user can command processor 106 via keyboard 108 and/or mouse 110. Processor 106 analyzes the received image and identifies specific regions of the original image as being a certain type. Any one or combination of well known image analysis algorithms can be used to identify regions within the original image. Generally, this is accomplished by segmentation and classification of image data.

Processor 106 compares each identified region with a reference image data. For example, the features of the first classified region are compared with the features of the next classified region. Reference image data can be any one of the following:

1. Image data from another region obtained by the image analysis algorithm; or
2. Image data from the same or different regions stored in a database.

The result of the comparison step is communicated to the user via video screen 112, printer 114, modem 116 to a remote graphics generator, or Local Area Network ("LAN") 118 to other computer systems and to other external devices such as a robotics device 119 which receives guidance information from the image data. The result of the comparison step could also be stored in different storage media, such as floppy disks, to be used later. The system of the present invention is capable of communicating the results in graphical or textual format. System 100 is also capable of communicating graphical or textual information at any stage of the process. For example, the user may obtain a graphical representation of identified regions of the original image.

Figure 2:
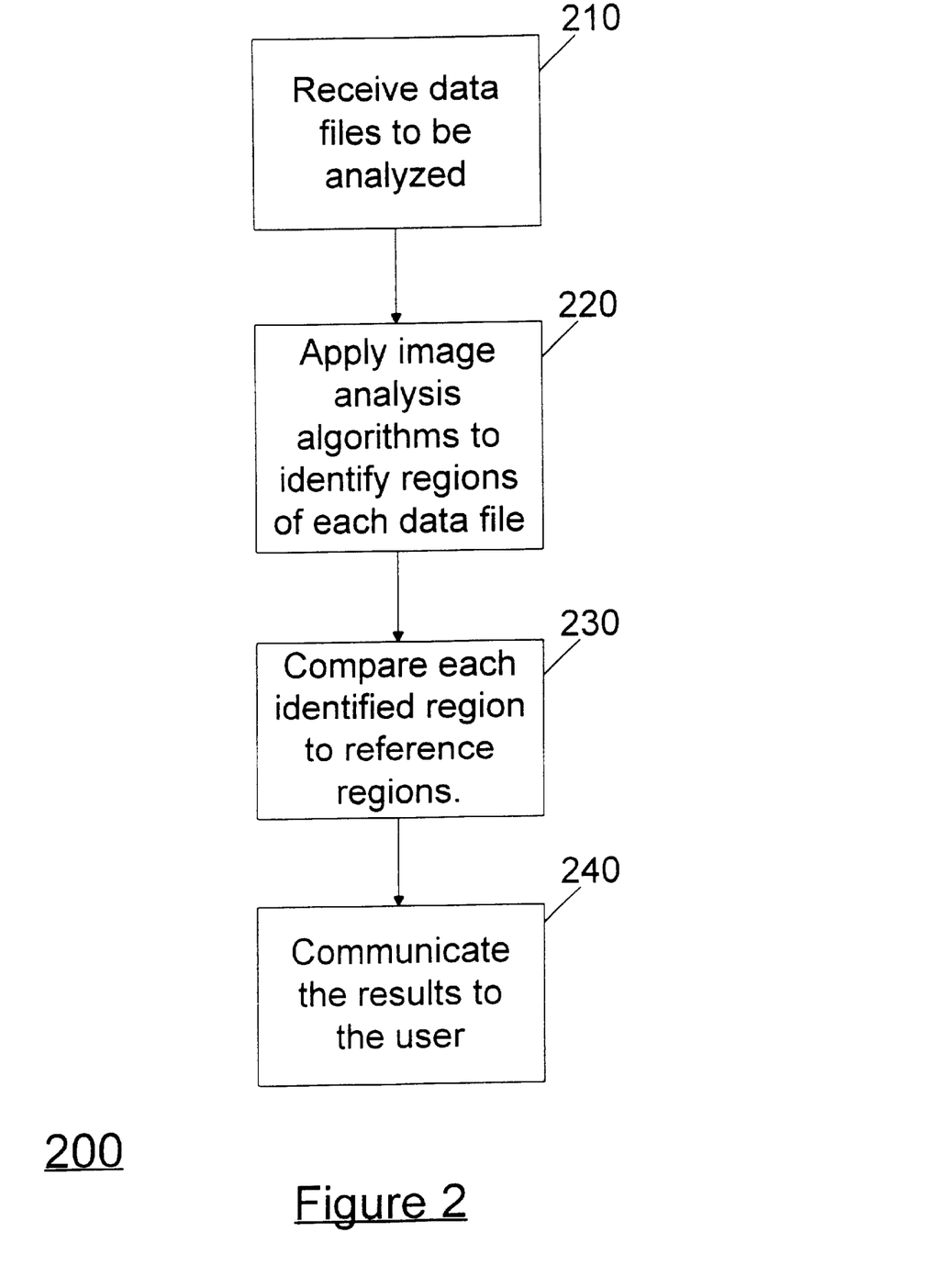
FIG. 2 shows the flow chart of one embodiment of the method of the present invention.

FIG. 2a is a flow chart outlining a method of the present invention. Method 200 begins by receiving one or more data files, each representing one or more images, as shown in step 210. Next, in step 220, any of the several generally known image analysis algorithms are used to identify specific regions of each data file.

Next, in step 230, each identified region is compared to one or more regions. As explained above, a reference region could be any one of the other identified regions, any one of identified regions of another image of the same object, or features of the same or other regions which are stored in a database. For example, in step 230, features of each identified region could be compared to the features of one or more reference regions.

Typical features of an identified region include region volume, area, shape and intensity of the contained pixels/voxels. For example, if a greyscale image is being analyzed, and a specific anatomical structure is identified as a certain region of interest by image analysis algorithms, one can compare the mean numerical greyscale value of the region with the mean greyscale value of that part obtained from a reference database of population norms. Alternatively, one could compare that mean greyscale value to a value obtained from the same patient at a different time, or in a different condition.

In one example, the present invention may be used to analyze medical images, such as an image of the brain. The mean greyscale of any region within the image of the brain may be compared with a second image. This second image, which provides a standard of reference, may be the image of the whole brain or a contralateral counterpart of the region of interest. By comparing the mean greyscale of both images, the present invention can perform a quantitative analysis of the brain. For instance, the volume of any given region in the brain (i.e., as measured in pixels) can be compared to, for example, the pixel volume of a patient's entire head. Using the mean greyscale of the image of the entire head as the relative scale, a diagnosis of that region can be formed. Hence, by comparing one region with another, one can obtain useful information that cannot be obtained by analyzing the absolute values of the features alone.

In the case of functional brain imaging modalities, such as PET, SPECT, and functional MRI, the pixel/voxel values may represent the degree of activity of the corresponding brain part, thereby ascertaining whether that part is resting or overactive. In the case of the more common structural imaging techniques, such as CT and conventional MRI, the pixel/voxel values may represent qualities such as the density of the corresponding anatomical part. This, for example, may indicate when a tumor has eroded a specific part of a bone. Objectively comparing the size, shape, area, or volume of an identified anatomical structure can be similarly useful for determining if a part is bigger or smaller than normal, if it is damaged, or if it has grown or shrunken since the previous year (e.g. tumors).

Any of numerous tools can be used to perform step 230. For example, statistical algorithms can be used to determine mean pixel value or standard deviation of one of the features. Simple arithmetic operations, such as the subtraction of the area or mean pixel value from the reference, are also very useful.

Standard and well-known statistical tests, such as the T-test, can also be used to determine the statistical significance of any difference found between the samples being compared. The specific statistical tests used depend upon criteria such as the number of samples being compared and/or the number of variables being analyzed. Preferably, the system would have means to determine which test is most suited to the data available. The current invention does not specify any unique statistical routines, but rather employs established methods as one stage of the process.

The results of step 230 are communicated to the user in step 240. The method of the present invention is capable of providing the textual or graphical results to the user for further analysis by the user. Results after each individual step, e.g. steps 220 and 230, can also be communicated to the user to help in analyzing the results of step 230. For example, if the image of a patient's brain is being studied, the present invention is capable of providing the initial image, images of specific parts, regions or anatomical structures of the brain, i.e. the results of step 220, and data, in graphical or textual versions, depicting the results of step 230 to the doctor. This enables the doctor to observe the brain at each stage and draw more accurate conclusions.

Figure 3:
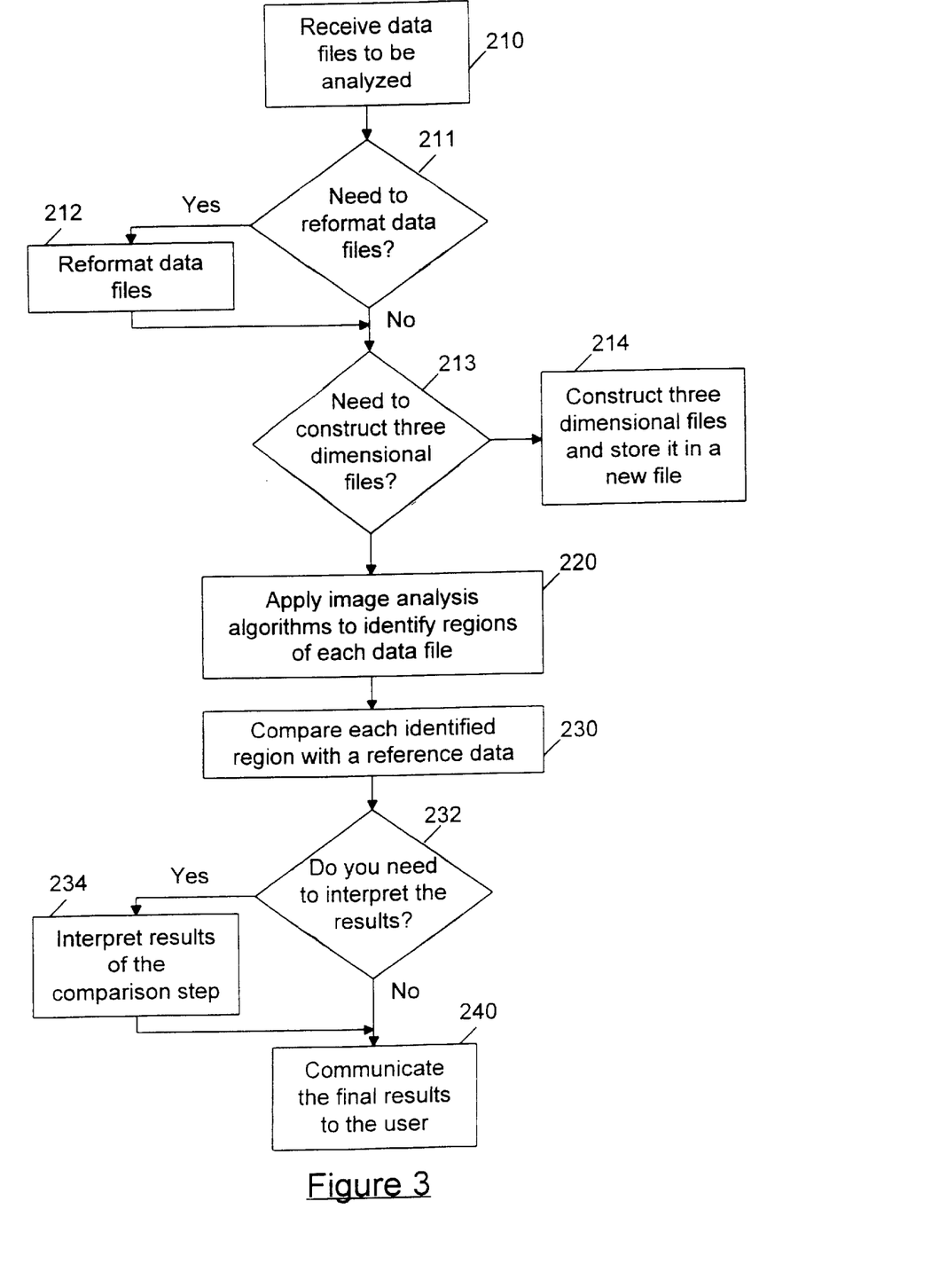
FIG. 3 shows the flow chart of a second embodiment of the method of the present invention.

FIG. 3 shows a second embodiment of the method of the present invention. In addition to steps 210–240 of method 200, the method of FIG. 3 includes additional processing steps. As in method 200, the method of FIG. 3 begins by receiving data files, each of which represent an image of an object.

Typically, files generated by image generators can be directly used by the method of the present invention. However, in cases where the generated files are arranged in a format not directly analyzable by the present invention, the present invention is able to reformat those files such that they can be used. In step 211, the present invention determines whether input files need to be reformatted. If so, step 212 reformats each individual file and then proceeds to step 213. If the result of the inquiry in step 211 is no, the method of FIG. 3 proceeds directly to step 213.

Typically, each input file includes information regarding a 2 or more dimensional image of the object under test. Where the input file includes information regarding a 2-dimensional image, it may be more beneficial to reconstruct a 3-dimensional image of the object before identification step 220. Often, 3-dimensional images provide better pictorial representations of different regions in an object under test.

Further, the analysis of 3-dimensional volumes of image data often provides more accurate and meaningful results. To illustrate this point, lets assume that a doctor wants to determine whether a tumor has increased or decreased in size. The doctor may proceed by comparing a current image of the body part containing the tumor with a reference image of that body part containing the tumor taken earlier. However, if only a single 2-dimensional slice is used, the position of the slice in the tumor with respect to the reference slice may be different. As a result, the conclusions reached by the interpretive step (step 234) may be inaccurate. To overcome this problem, a series of 2-dimensional slices of the body part containing the tumor may be analyzed as a group, thereby giving the effect of analyzing a 3-dimensional image.

Specifically, the series of images may be analyzed and interpreted by a technique referred to as "additive slice-object attribute values." This technique takes each attribute that is derived (i.e., extracted feature) from each separately classified region in each slice, and sums them separately as a function of attribute type and class. For example, in a series of tomographic slices designated 1–35, one might sum the area of the Right Lateral Ventricle in Slice 1, plus the area of the Right Lateral Ventricle in Slice 2, plus the area of the Right Lateral Ventricle in slice 3, and so on for the whole slice series. Thus, all slices that contain an object classified as being Right Lateral Ventricle contribute to that particular sum total. When the same process is repeated for all of the regions that the program attempts to classify, the total slice-object attribute values may be used as the input for the comparison and interpretion processes as described in this application.

The additive slice-object attribute value technique provides advantages over conventional 3-D image analysis techniques (whether native or reconstructed from slices), such as requiring less powerful hardware and software. Examination of a the typical process that is performed in 3-D image analysis illustrates this point. 3-D image analysis requires reconstruction of the data set representing the series of 2-D slices into a data set representing a 3-D image prior to analysis. This means that the attributes of each anatomical region have been effectively added prior to being segmented, classified, attribute-extracted, or interpreted. Thus, those image analysis steps are being carried out on a single 3-D data set. However, in the additive slice-object attribute method, the addition is performed after segmentation, classification, and attribute extraction. As a result, the image analysis steps are being performed separately on a series of 2-D images. These calculations may be performed prior to the comparison and interpretation steps, or as a part of the process of interpretation, as will be shown in the following examples. By eliminating the need to perform a 3-D reconstruction as well as the comparative ease with which 2-D images can be analyzed, less expensive systems, such as personal computers, may be employed to implement the present invention.

Classification methods may be divided according to the nature of the classification criteria which enables specific objects or regions within an image to be identified. The criteria may be the same for all data within a data set, i.e., a series of slices or a single 3-D matrix. Such criteria are referred to herein as "universal classification" criteria. Universal criteria, for example, may include a specific shape, intensity, and image matrix location that characterize a left eyeball, regardless of how high or low the slice intersects that eyeball. In the analysis of a 3-D image, be it a reconstruction or a native 3-D image, universal criteria are generally used since there is only a single data set being considered.

However, when analyzing a series of 2-D slices representative of a 3-D volume (such as an MRI or CT series), the use of universal criteria, while possible, is problematic. As an example, a cross-section of a lateral ventricle looks radically different depending upon which slice is examined. To compensate for this difference, an alternative classification approach, which is referred to herein as "slice-specific classification criteria," is used. In this method, the specific classification criteria that are applied to the objects on each slice or image in the series reflect the differences in the way that those objects are expected to appear in the various slices.

For example, in a CT axial series of slices, those slices near the middle of the series might have Left Lateral Ventricle classification criteria describing an elongated, oval to crescent-shaped object located near the midline of the (anterior/posterior) midline of the head, which has a long axis generally parallel to the (anterior/posterior) long axis of the head's cross-section, an area of about 905 pixels and runs the majority of the length of the head's (anterior/posterior) length. In contrast to those slices near the middle of the series, a slice from closer to the base of the skull in that same series may have assigned to it classification criteria that describe a Left Lateral Ventricle somewhat differently—perhaps an oval-shaped object occupying only the lower right quadrant of the cross section's image which has a long axis that is diagonal to the long axis of the head's cross-section and an area of only about 240 pixels. Thus, because the same anatomical regions look different in different slice planes, applying slice-specific classification criteria to accommodate those variations can be very useful. Note that the above examples of classification criteria, while demonstrated here in mostly qualitative terms, may actually use precise number sets, with a defined range of tolerance. Classification modules that set up to perform such functions by techniques known in the art are commercially available. Such software, in addition to that already described, includes Optimas (Optimas Corporation, Seattle, Wash.).

Universal classification and slice-specific classification criteria may be patient and/or application specific. That is, the same criteria may or may not be applicable for a different patient and/or imaging modality. For example, two different patients or imaging modalities may have two different universal classification criteria sets, or two different collections of slice-specific classification criteria assigned to them.

In some embodiments, slice-specific classification criteria may be selected and implemented automatically by standardizing the slice planes used in acquiring the images. Standardization enables the system to determine the location in or on the patient that each slice represents. For example, the first slice of the series should represent a specific location in or on the patient, as should the last image of the series. This allows the software to apply the appropriate classification criteria to the appropriate image.

Any of numerous techniques can be used to perform standardization. For example, standardization may be performed by acquiring a series of images along a specific axis which begins and ends at a specific point and having a fixed number of slices therebetween. The opportunity for setting up such a scan is normally available in the form of a "localizer"—a brief orienting scan which is a normal part MRI data acquisition that precedes the acquisition of the desired slices, means for which are provided as a standard feature of modern MRI machines.

Table I shows the field definitions from a FileMaker Pro (Claris Corporation, Santa Clara, Calif.) database. The software is customized using macros to provide a simple working demonstration of medical diagnosis interpretation of image-analysis derived data by the method of the present invention, and specifically, using the additive slice-object attribute method. The serial slice MRI data held and interpreted by the database are acquired by automated image segmentation, classification, and attribute (feature) extraction, and exportation carried out by a macro (not shown) controlling a commercially available image analysis package such as one produced by Optimas Corporation, Seattle, Wash. A description of the Optimas software package can be found in *Optimas 5 User Guide and Technical Reference,* Vol. I and II, 6th ed., November, 1994, Optimas Corporation, Seattle, Wash., all incorporated herein by reference for all purposes. The Optimas macro identifies the Left and Right Cerebral Hemispheres, Lateral Ventricles, and Eyes in each slice of a series. Also, the macro extracts the Mean Pixel Intensity ("MPI"), and Area ("Volume") of those regions in each slice, and sends that numerical data to the FileMaker Pro database. After the derived data are imported by the database macro, comparison and interpretation steps may be carried out, as shown in the "Formula/Entry Option" column of Table 1. Note, for example, how "Summary of Volume RCH" totals all database fields of data that represent RCH (Right Cerebral Hemisphere), from all slices represented in the selected patient record according to the slice-object attribute value techniques. Also note the rule-based deductive systems used in this example, such as the "Hydrocephalus Test" which considers the total additive slice-object attribute values represented as "summary" numbers by a comparison step, and uses these to interpret whether or not a disease state should be considered.

TABLE I

| Field Name | Field Type | Formula/Entry Option |
|---|---|---|
| Volume RCH | Number | |
| Volume LCH | Number | |
| MPI RCH | Number | |
| MPI LCH | Number | |
| Volume RLV | Number | |
| Volume LLV | Number | |
| MPI RLV | Number | |
| MPI LLV | Number | |

TABLE I-continued

| Field Name | Field Type | Formula/Entry Option |
| --- | --- | --- |
| Summary of Volume RCH | Summary | =Total of Volume RCH |
| Summary of Volume LCH | Summary | =Total of Volume LCH |
| Summary of MPI RCH | Summary | =Total of MPI RCH |
| Summary of MPI LCH | Summary | =Total of MPI LCH |
| Summary of Volume RLV | Summary | =Total of Volume RLV |
| Summary of Volume LLV | Summary | =Total of Volume LLV |
| Summary of MPI RLV | Summary | =Total of MPI RLV |
| Summary of MPI LLV | Summary | =Total of MPI LLV |
| Cerebral Atrophy Test | Calculation (Text) | =If(Summary (Summary of Volume LCH, Summary of Volume LCH)<.85* Summaru (Summary of Volume RCH, Summary of Volume RCH), "Left Cerebral Hemisphere Atrophy", If(Summary (Summary of Volume RCH, Summary of Volume RCH) <.85* Summary (Summary of Volume LCH, Summary of Volume LCH), "Right Cerebral Hemisphere Atrophy", "The volume of the LCH is" & Middle(NumToText(S % Volume of RCH to LCH),2,2) &"." & Right(NumToText(S % Volumne of RCH to LCH),2)& "% greater than the RCH. Within Normal Limits")) |
| Slice | Number | |
| Hydrocephalus Test | Calculation (Text) | =If(Summary (Summary of Volume RLV, Summary of Volume RLV)+ Summary (Summary of Volume LLV, Summary of Volume LLV)>.25* (Summary (Summary of Volume RCH, Summary of Volume RCH)+ Summary (Summary of Volume LCH, Summary of Volume LCH)), "Consider Hydrocephalus"," ") |
| Patient Name | Calculation (Text) | =If(Patient Middle Initial < > " ", Patient Last Name & ","& Patient First Name & " "& Patient Middle Initial, Patient Last Name &","& Patient First Name) |
| Patient Number | Text | |
| Regional Intensity Test | Calculation (Text) | =If(Summary (Summary of MPI RCH, Summary of MPI RCH)<.85* Summary (Summary of MPI LCH, Summary of MPI LCH), "Right Cerebral Intensity Increase. fMRI: Consider functional activation. CT: Consider fresh bleed.", If(Summary (Summary of MPI LCH, Summary of MPI LCH)<.85* Summary (Summary of MPI RCH, Summary of MPI RCH), "Left Cerebral Intensity Increase. fMRI: Consider functional activation. CT: Consider fresh bleed.", "Within Normal Limits")) |
| Slice Graphic | Picture/Sound | |
| Patient Last Name | Text | |
| Patient First Name | Text | |
| Patient Middle Initial | Text | |
| % Volume of RCH to LCH | Calculation (Number) | =Round (Volume LCH − Volume RCH)/Volume LCH, 4) |
| % Volume of LCH to RCH | Calculation (Number) | =Round (Volume RCH − Volume LCH)/Volume RCH, 4) |
| S % Volume of RCH to LCH | Calculation (Number) | =Round((Summary (Summary of Volume LCH, Summary of Volume LCH) − Summary (Summary of Volume RCH, Summary of Volume RCH))/Summary (Summary of Volume LCH, Summary of Volume LCH),4) |
| Num to Text | Calculation (Text) | =NumToText (S % Volume of RCH to LCH) |

™ 1995

Alternatively, a true 3-dimensional volume data set may be used. Because the entire volume of structures in question is analyzed, there is little chance of sampling error affecting the comparisons. Alternatively, by using 2-dimensional slice images obtained from specific, precisely defined locations or planes within the body and tumor, the process can perform comparisons with a corresponding slice of the reference image, thus minimizing or eliminating any discrepancies.

In step 213, the present invention asks the user whether a 3-dimensional image is desired. If so, step 214 of the present invention cross correlates the set of 2-dimensional images of the object and constructs a 3-dimensional image of the object, interpolating the data to appropriately fill in the areas between the two-dimensional slices. The 3-dimensional image is then stored in a new file and processed in step 220. If the answer in step 213 is no, the present invention directly proceeds to step 220. Obviously, where the input data files include information on 3 or more dimensional images, steps 213 and 214 are skipped by the present invention.

Step 220 and 230 are identical to those explained in method 200 of FIG. 2. Where a 3-dimensional image has been constructed, the features of individual 3-dimensional regions are compared to the features of a reference 3-dimensional image data.

Often, it is desirable to let a computer interpret results of the comparison step based on prior knowledge stored in a database as an attribute of an identified region. For example, a specific region of a patient's brain might change in size or volume when it is affected by a certain diseases. Therefore, if the result of the comparison step contains all of the features of an abnormal region of the brain, the computer can interpret and draw the conclusion that the region under study is abnormal. In step 232, the method of FIG. 3 asks the user whether an interpretation of the results is desired. If so, the system interprets the results in step 234 and then proceeds to step 240. If no interpretation is desired, the system goes directly to step 240. Step 240 is identical to what has been described above. Again, the system of the present invention is capable of providing visual and textual information to the user at the end of any step in the method of FIG. 3.

Step 234 may be performed using a variety of tools known in the art. In general, numerical values obtained from step 230 are used as the input for the logical examination by a computerized medical "expert system", such as a knowledge-based system, rule-based system, heuristic system, artificial intelligence system, neural network, fuzzy logic system, a combination of one or more of these systems, or the like. The expert system, which may employ "describe-and-match", "decision trees", "neural nets", and/or "rule-chaining" techniques, may process the input data on a single level or multiple levels of decisions. A description of various applicable techniques is provided in Winston, P. H. *Artificial Intelligence* Third Edition, Addison-Wesley Publishing Company, Menlo Park, Calif., 1992 and in Holtzman, S. *Intelligent Decision Systems* Addison-Wesley Publishing Company, Menlo Park, Calif., 1989, both incorporated herein by reference for all purposes.

Additionally, artificial intelligence techniques applied specifically to medical diagnostic problems are described in Shortliffe, E. et al. "Knowledge Engineering for Medical Decision Making: A Review of Computer-Based Clinical Decision Aids" *Proceedings of the IEEE* vol. 67, No 9 September 1979, pp. 1207–1224 and in Heckerman, E. et al. "Toward Normative Expert Systems: Part I, The Pathfinder Project" *Methods of Information in Medicine* 31: 90–105 1992 pp. 90–05, both incorporated herein by reference in their entirety for all purposes.

"Multisurface method pattern separation", which is another artificial intelligence technique, have also been used for medical diagnosis based on the appearance of structures. A description of this technique is provided in Wolberg, W. H. and Mangasarian "Computer-Designed Expert Systems for Breast Cytology Diagnosis" *Analytical and Quantitative Cytology and Histology,* Vol. 15, No. 1, February 1993, pp. 67–74, incorporated herein by reference in its entirety for all purposes.

The following example illustrates a typical application of the present invention in the medical field. Using a magnetic resonance sequence that yields both structural and functional data, twenty 2-dimensional 16-bit greyscale images, representing consecutive transverse slices of a subject's brain are obtained, and entered into a computer using the process of the current invention (step 210 of FIG. 2 or 3). The computer cross-correlates data from each of the image files, produces a 3-dimensional reconstruction of the subject's brain, and displays it on screen (step 214 of FIG. 3). Using any one of many commercially available image analysis programs, the computer recognizes numerous specific anatomical structures of the brain in the data. These structures include the frontal, parietal, temporal, and occipital lobes, the thalamus, hippocampus, and amygdala on each side, the cingulate gyrus, the cerebellar, auditory, and visual cortices, and the motor and sensory strips (step 220 of FIG. 2 or 3).

Next, the attributes of the different identified regions can be compared with each other to draw medical conclusions (steps 230 and 234 of FIG. 3). For example, comparisons between the right and left hemispheres show that the volume of the right parietal lobe is 23% smaller than on the left, and the greyscale pixel intensity difference shows that the right parietal lobe is much less metabolically active than the left, particularly over the motor strip, which has a mean greyscale value of 32% less than the motor strip on the larger side.

Comparisons of the data set with the population norms shows that the right parietal lobe is 15% smaller than the normal parietal lobe. The results also indicate that the right parietal lobe is hypoactive relative to a normal one. The left parietal lobe and mirror strip were within normal limits. Comparisons of the data set with an MR examination done 3 years previously show that the right parietal lobe is now 11% smaller than it had been previously. The mean greyscale value in the right motor cortex, however, show improvement in metabolic activity by 10%. The differences are demonstrated to be statistically significant. Most of the above comparison step utilizes simple subtraction of data to compare data on each region.

Graphics of the results may show a 3-dimensional image of the subject's brain. To demonstrate its hypoactivity (step 240 of FIG. 2 or 3), the right parietal lobe is colored largely blue (especially over the motor strip). By contrast, the left parietal lobe is largely yellow and red, indicating its greater level of activity. The screen prints the above statistical results along with likely diagnoses. For example, the diagnoses may be a right-sided stroke, occurring more than three years ago, in the distribution of the middle cerebral artery, and a secondary right-sided parietal atrophy.

Figure 4:
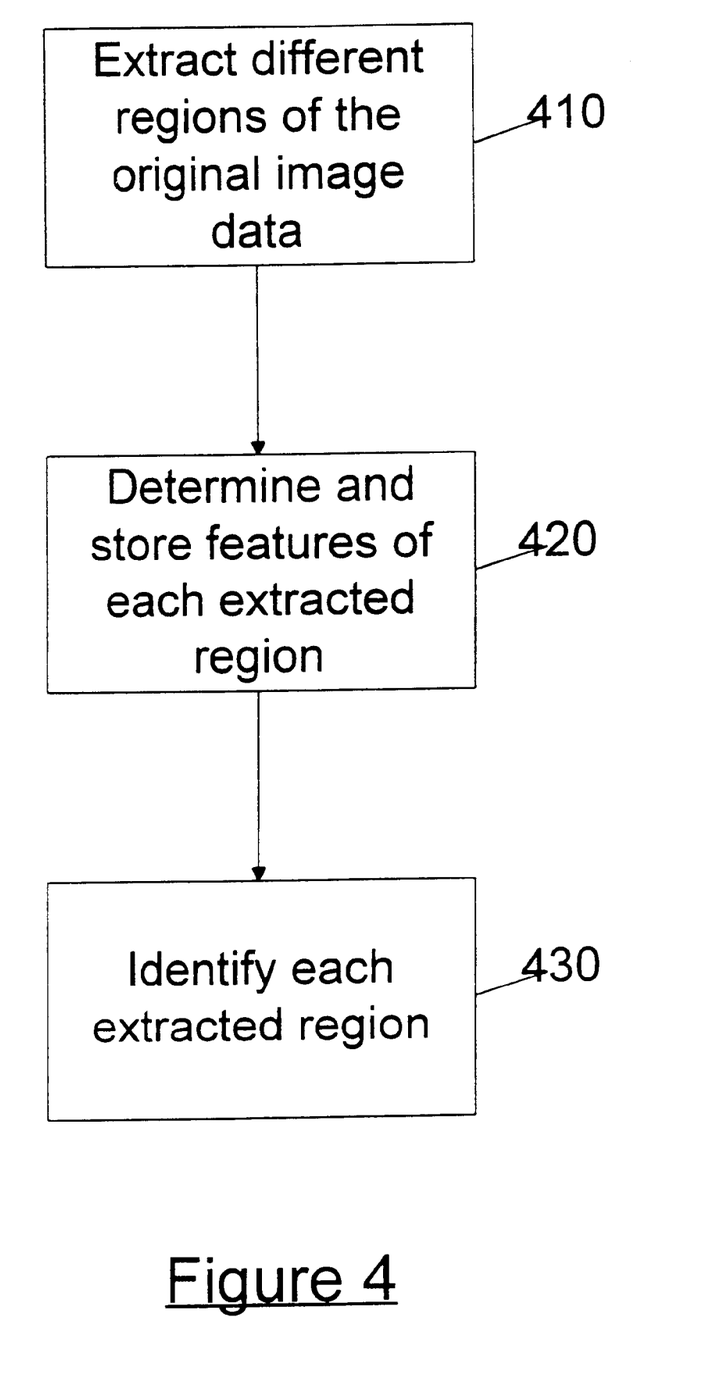
FIG. 4 shows the flow chart illustrating the steps to perform step 220 of FIGS. 2 and 3.

As mentioned before, any commercially available image analysis algorithms can used to perform identification step 220 of FIG. 2 or 3. FIG. 4 illustrates an example of the method used by some of the above commercially available image analysis algorithms to identify different regions of an original image. Other image analysis algorithms may use slightly modified version of the method shown in FIG. 4. Improved methods of image analysis are continuously being developed and implemented by various parties. The selection of a suitable image analysis algorithm depends on the type and complexity of the original image, and regions that must be identified. The present invention does not specify any unique image analysis routine, but rather employs established methods to identify regions of an original image data.

In step 410 of FIG. 4, different regions of each original image data file are extracted, for example, by segmentation. A wide variety of region extraction techniques are used by any one or a combination of image analysis techniques or commercially available programs. Applicable techniques include "amplitude thresholding", "component labeling", boundary based approach", "run-length connectivity approach", dilation, erosion, hole filling, filtering, etc. Once different regions are extracted, specific features of each extracted region are calculated and stored in a data file in step 420. Depending on the image analysis technique employed, calculation of the features may not be necessary because it may already be done as a result of the segmentation step. As mentioned above, typical features include size, volume, shape, pixel intensity, and location of the extracted region. Location of the extracted region refers to the approximate area of the original image which includes the extracted region. For example, in a two dimensional image, the present invention determines which quadrant includes the delineated region. Once the location of each delineated region is determined, the present invention proceeds to identify it.

In step 430, each extracted region is identified. In this step, features of each extracted region are compared to the parameters of regions known to be found in the same general location as the region segmented off in the previous step. When there is a match between the features of the delineated region and the features of a known region within a predesignated range of accuracy, the delineated region is identified to be the same as the known region. The identified region of the original image is then used in comparison step 230 of FIGS. 2 and 3. The identification process is repeated for every delineated region of the original image.

Typical features of known regions are stored by the user in a data-base prior to analyzing an image of an object using the present invention. Features of each known region are stored in a separate data file. Information in each data file is used for identification purposes and is updated whenever new information on the corresponding region is obtained.

Figure 5A:
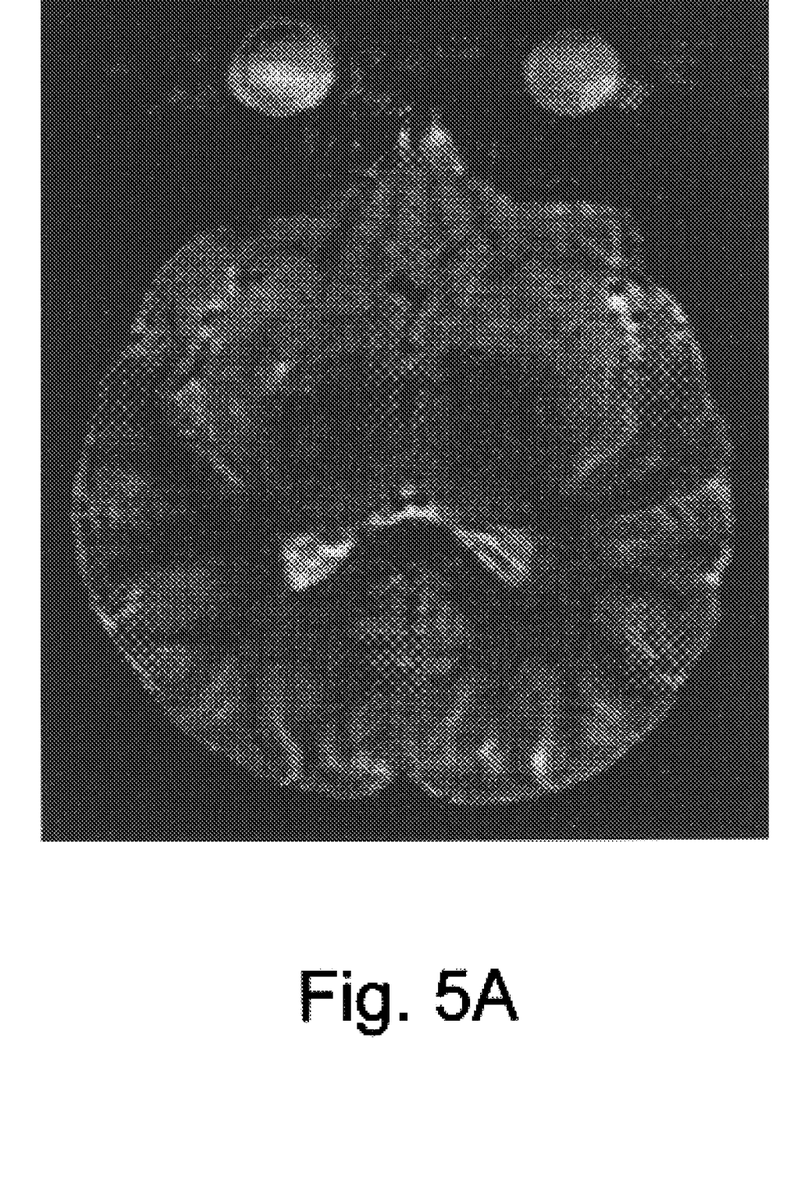
FIGS. 5a–5c show an example of segmenting and classifying parts of an image.

The identification process of FIG. 4 is better understood in view of the following example. Assume that a 2-dimensional greyscale image of a patient's brain, as illustrated by FIG. 5a, is being studied using the present invention. Also assume that user desires to specifically study certain anatomical structures, which, for example, may be the patient's left orbit, left lateral ventricle, and right cerebral hemisphere. As shown, various anatomical structures or regions are represented by the different intensity levels of the image.

Figure 5B:
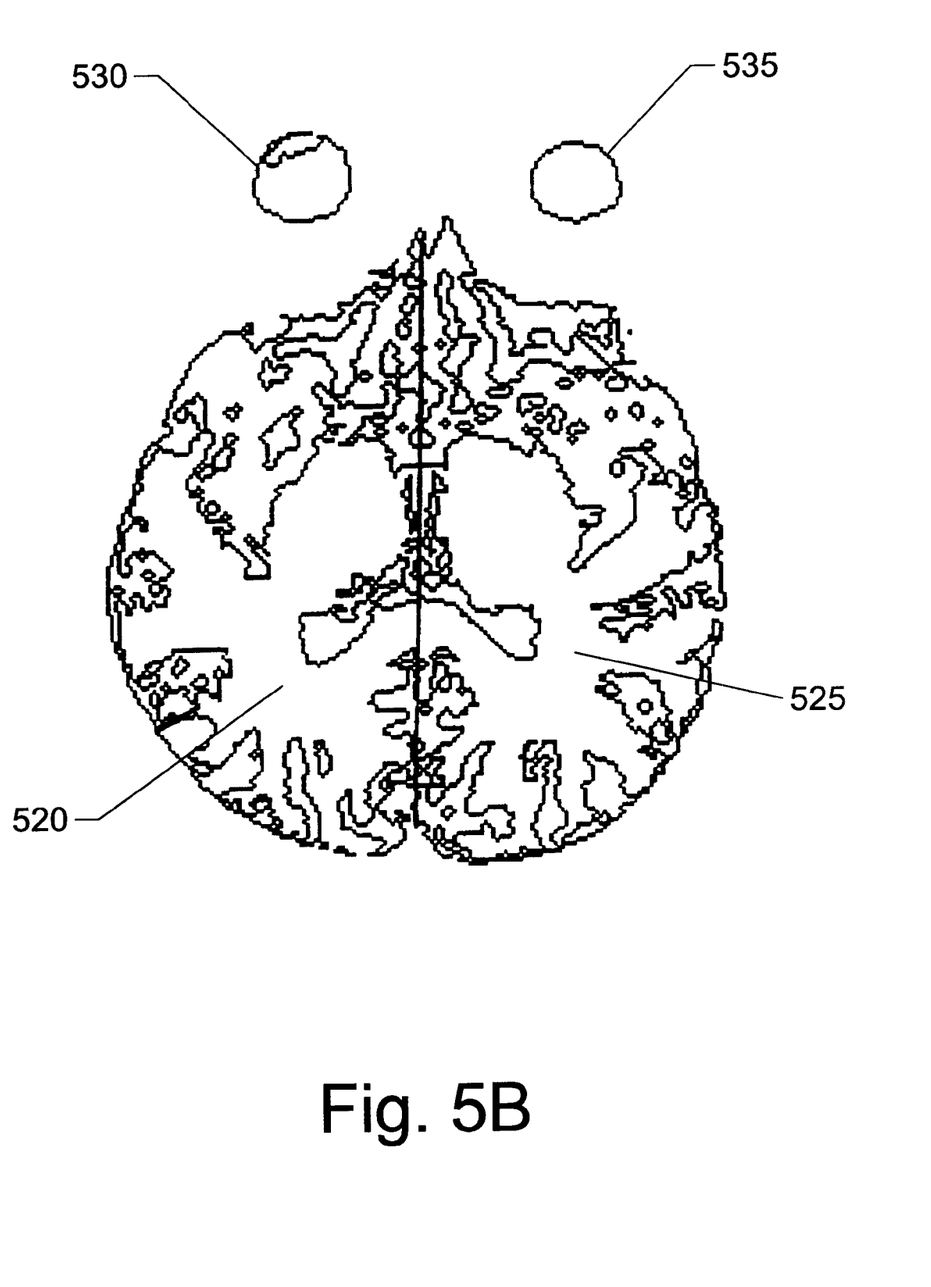

The greyscale image is entered into the system of the present invention. The image is segmented into different regions using any one of or a combination of the above mentioned image analysis techniques. Referring to FIG. 5b, the system segments the image of the brain into numerous parts including regions 520, 525, 530, and 535. Depending upon the segmentation method used, however, such regions may not actually be given anatomical names until identification. Additionally, the image may be further delineated into other regions, as indicated by lines within the brain.

The system, using image analysis techniques described herein, classifies the delineated regions. In order to classify the right cerebral hemisphere, left orbit, and left lateral ventricle, the system analyzes both the attributes of, and the relative locations of the delineated regions corresponding to the area of each desired anatomical structures. Thus, only those delineated regions corresponding to the area where a left orbit, left ventricle, and right cerebral hemisphere are expected to be are considered. Thereafter, features of each delineated region within that area are compared to features of the desired anatomical structures for classification.

Figure 5C:
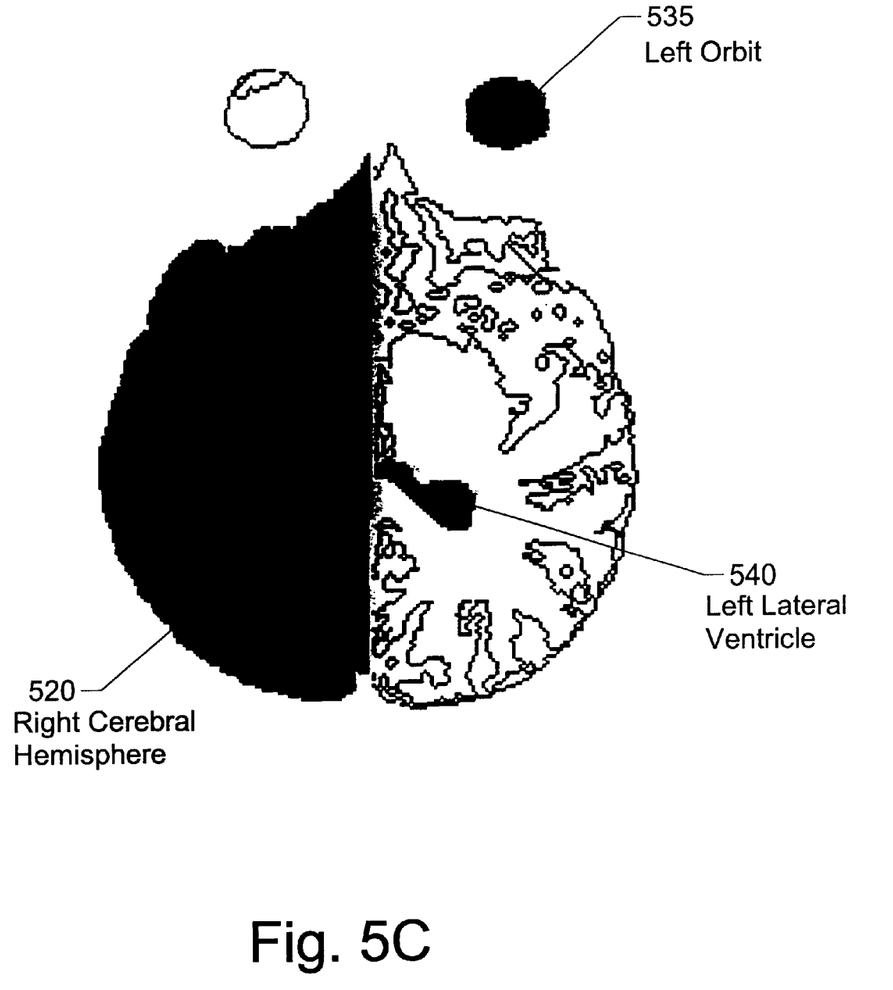

For example, in the case of classifying the left orbit, the regions corresponding to the area where the left orbit are located are considered. The features of each region are compared to the features of a typical left eye. If there is a match within a designated range, then the system classifies that delineated region as the left eye. The system repeats this process until all desired anatomical structures have been classified or cannot be identified. As illustrated in FIG. 5c, right cerebral hemisphere 520, left lateral ventricle 540, and left orbit 535 are classified by the system of the present invention.

In alternative embodiments, the system may simply identify a feature within a specific and constant portion of the image as the feature of interest for later comparison.

The following is an example of one application of the present invention as used in the context of studying the human brain. Table II lists examples of regions and some image attributes (features) regarding those regions within the image. Each pound sign, which represents a numerical value for that attribute, is calculated by image analysis methods and stored in that database cell or address.

TABLE II

| Region Number | Anatomical or Functional Region or Part Identified | Mean Pixel Intensity (MPI) | 2-D Compactness or 3-D Compactness | Volume |
|---|---|---|---|---|
| 1 | Left Hemisphere | # | # | # |
| 2 | Right Hemisphere | # | # | # |
| 3 | Left Thalamus | # | # | # |
| 4 | Right Thalamus | # | # | # |
| 5 | Left Basal Ganglia | # | # | # |
| 6 | Right Basal Ganglia | # | # | # |
| 7 | Left Temporal Lobe | # | # | # |
| 8 | Right Temporal Lobe | # | # | # |
| 9 | Left Occipital Lobe | # | # | # |
| 10 | Right Occipital Lope | # | # | # |
| 11 | Left Parietal Lobe | # | # | # |
| 12 | Right Parietal Lobe | # | # | # |
| 13 | Left Motor Strip | # | # | # |
| 14 | Right Motor Strip | # | # | # |
| 15 | Left Sensory Strip | # | # | # |
| 16 | Right Sensory Strip | # | # | # |
| 17 | Third Ventricle | # | # | # |
| 18 | Sub-pia volume (brain volume) | # | # | # |
| 19 | Volume between scalp and pia | # | # | # |
| 20 | Entire image | # | # | # |
| 21 | Right Lateral Ventricle | # | # | # |
| 22 | Left Lateral Ventricle | # | # | # |
| 23 | Pons | # | # | # |
| 24 | Unidentified Structure A | # | # | # |
| 25 | Unidentified Structure B | # | # | # |
| 26 | etc. | # | # | # |

As shown, Table II lists structures and features (attribute data such as MPI and volume) as they might appear in the database. The data therein may pertain to one image or a set of images. For example, if the patient had a second scan, it would be analyzed to produce a second similar database record containing the new data. Each patient are assigned separate records. In this way, any two or more attributes (e.g. volume, MPI) can be compared, as shown in step 230 of FIGS. 2 and 3, between or within such database records.

A "compactness" index value may also be provided in the database as an attribute of an identified region. "Compactness" refers to a measure of the degree to which a two-dimensional shape approximates the shape of a circle. Also, a similar index called 3-D compactness, which describes the degree to which a three-dimensional image shape approximates a sphere, may be provided. For a perfect sphere, the index value is 1. Conversely, for or a long thin line, the index value approaches 0. A description of compactness index values is provided in *Practical Digital Image Processing,* by Rhys Lewis, Ellis Horwood, New York 1990, p. 228, incorporated herein by reference in its entirety for all purposes.

Other information derived from the image analysis may also be databased. The information may be stored in various forms, including, but not limited to alphanumeric text (e.g., a numerical value or name), graphical form, and feature vectors. Such data might include volume, indices of shape and position, mean, median and mode pixel intensities, medialness (also known as "cores"), linearity, and others.

The database, for example, may be analyzed using a rule-based diagnostic system to provide medical interpretations of all these structure attributes or features. In one embodiment, comparison step 230 is done in all pre-designated combinations prior to interpretation. For purposes of explanation, the analysis process in the following example has been simplified to identify and interpret only two regions, the right and the left sides of the brain. Further, only two features, volume and mean pixel intensity (MPI), are extracted from the two regions. A corresponding database file, which shows a population average of these same regions and associated attributes, is provided.

As previously described, the present invention compares each possible combination. Let's assume that the values for the subject and population average standard are as listed in Table III.

TABLE III

|  |  | VOLUME | MPI |
|---|---|---|---|
| SUBJECT | Right Brain | A | C |
|  | Left Brain | B | D |
| POPULATION AVERAGE | Right Brain | E | G |
| STANDARD | Left Brain | F | H |

The variables A through H in the above Table III represent the numerical values corresponding to those identified areas and their features or attributes. Employing a ratio pairings technique, the system creates numerical ratios such as A/B, A/C, A/D, A/E, B/F, C/G, D/H, plus the other possible ratio pairings. These ratios, when calculated out as numbers, can form the data upon which a rule-based deduction system can operate in order to interpret possible medical and physiological conditions, as represented in the image.

As an example, the system may formulate a rule comprising the following statements:

IF A/B ≦ .90
AND A/E ≦ .75
THEN print "Consider Condition J as a diagnosis"

"Condition J", for example, might be "Right Cerebral Atrophy" or any other possible diagnosis. Keep in mind, however, that this rule is primarily intended only to show a simple example of the present invention which uses ratios with rule-chaining to perform interpretation.

Such rule systems may include "OR", "AND", as well as other logical type statements, and may utilize any of the many reasoning structures that are known in art. Table IV lists illustrative examples of other rules which may be used.

TABLE IV

| 1) | IF volume of Left Lateral Ventricle + Volume of Right Lateral Ventricle + Volume of Third Ventricle > X (a user-redefinable variable), AND the Sub-pia volume <Y (another user redefinable variable), THEN print "Consider Hydrocephalus". |
|---|---|
| 2) | IF Unidentified Object B's volume > P Then print "Consider tumor at junction of (list all regions tangential to Unidentified Object B)" |
| 3) | IF MPI of Left Temporal Lobe > Q over MPI of Entire Image THEN print "Short term memory is likely being accessed or laid down." (This rule may be used for a "functional imaging" modality such as PET.) |
| 4) | IF Volume of Left Temporal Lobe > R less than the volume of Right Temporal Lobe, OR Index of Compactness of Left Temporal Lobe < S THEN print "Consider Left Temporal Lobe atrophy". |
| 5) | IF volume of Left Parietal Lobe ≧ T% above the volume of the Right Parietal Lobe AND MPI of Left Motor Strip > U% above MPI of the Right Motor Strip THEN print "Right parietal lobe atrophy and hypoactivity is indicated. Consider cerebral vascular accident in the distribution of the middle cerebral artery". |
| 6) | IF diagnostic finding V is present in both old record and new record THEN print "Finding V was present at (date of old exam), and continues to be present at current exam." (This rule may be used for comparing an old record on a patient to a current one.) |

In some instances, it may be desirable to perform the comparison of ratios only as dictated by the flow of the interpreting step (step 234 in FIG. 3) in the rule based deduction system. For example, the system can, prior to interpretation, find the ratio of the left occipital to the right occipital lobe along with many other comparison ratios. However, depending upon the branches of the deductive system according to the deductive rules, occipital lobe volume ratio might never become a factor in the diagnostic process. Some such techniques may be used to fill more than one purpose with the process. Hence, the comparison, in retrospect, is unnecessary. Thus, by not calculating the comparison ratios until called upon, efficiency of the process is increased.

The consequent statements shown in quotation marks may be printed on screen, paper, or recorded to disk. Also, such statements may, according to techniques known in the art, be used as the basis for yet higher levels of reasoning regarding interpretation of the data. The word "print", in the examples above, has been used to generically describe any of a variety of types of subsystem outputs known in the art.

The preceding sample interpretive rules have been provided as simple examples of the present invention for demonstrative purposes. It is expected that such rules are dynamic; they will be changed, improved, or eliminated depending upon the user's needs and confidence in any given set of diagnostic criteria. It can be appreciated however, that such methods of rule chaining provide viable techniques by which data representing machine-defined image regions may be compared (step 230 in FIG. 3) and interpreted (step 234 in FIG. 3) according to likely diagnoses.

As previously discussed, a wide variety of artificial intelligence techniques can constitute the "interpreting" step 234, regardless of whether the comparisons are done in advance or as prompted by the progress of the decision process. Such techniques may be used to fill more than one purpose in the process. For example, describe-and-match strategies are useful for both region identification (step 220 in FIG. 2 or 3) and for interpretation (step 234 in FIG. 3). Other techniques, such as neural nets and decision analysis methods can also be employed for these tasks.

In alternative embodiments, forward or backward rule chaining may be employed. Backward chaining strategies are commonly employed in expert systems because backward chaining narrows the field of possible answers from many to few. Forward chaining may also be used, as it may be desirable to receive a list of likely possibilities for the diagnosis, rather than to rely on a single answer dictated by the computer. Hence, the "fan-out" that results from forward-chaining is desirable and advantageous in certain situations.

Additional data may be included as part of the data file database for each patient study. The data may include both graphical information and data which are not derived from images. For example, the patient's age, weight, height blood pressure, head circumference, known ailments, and other data constitute potentially useful data to the diagnostic expert system module. By incorporating such information the expert system can process it just like numbers and other data derived from image analysis. An example of such parameters in use is:

---
IF Age>55
AND Weight >200 lbs
AND Sex = Male
AND Volume of Right Parietal Lobe is > W% below
   the Volume of Left Parietal Lobe
THEN print "Consider right middle cerebral
   artery distribution CVA."
---

Note that the while the example above shows rules with many antecedent conditionals, this is primarily for demonstration purposes. The same consequent may be derived from the use of a series of simpler rules which are chained together, as described by Winston in chapters 7 and 8, already incorporated by reference.

Commercially available toolkits, such as M4 produced by Cimflex Teknowledge, Palo Alto, Calif., for rapidly constructing artificial intelligence systems via rule chaining and other techniques are widely available. Additionally, commercially available programmer's tool kits for Image analysis and object identification, including "Image Pro Plus Advanced Imaging Library™" (Media Cybernetics, Silver Spring, Md.), are widely available. Image analysis software applications which are pre-configured to perform image segmentation and classification when provided with classification criteria are also widely available, and include Global Lab Image (Data Translation, Marlboro, Mass.).

The method and the apparatus of the present invention are described above with reference to specific embodiments. Other embodiments will be apparent to those of ordinary skill in the art. Another example is when the present invention is used to detect concealed weapons in airports. The present invention can provide the entire image of the inside of a suitcase, the image of a suspicious object, and the result of the comparison step. In this case, the features of the suspicious object will be compared to the features of typical weapons generally close to the physical features of the suspicious object. It is therefore not intended that this invention be limited except as indicated by the appended claims.

I claim:
1. In a computer system comprising a processor, a method of performing data analysis on an image of a 3-dimensional object, the image comprising a series of 2-dimensional image slices, the method comprising:
   inputting the image into the computer system;
   using the processor to analyze each image slice of the image and to divide each image slice into at least one 2-dimesional region that corresponds to a 3-dimensional region within the object to investigate a feature of said 3-dimensional region, wherein the analysis step comprises the steps of:
      inputting into the processor criteria corresponding to characteristics of a known region; and
      comparing said criteria with each image slice in order to identify said at least one 2-dimensional region;
   using the processor to derive information describing said at least one 2-dimensional region in each image slice;
   using the processor to combine said derived information for said at least one 2-dimensional region from the image slices to determine said feature of said 3-dimensional region;
   using the processor to compare said feature of said 3-dimensional region to a feature of a reference region in order to determine a difference between said 3-dimensional region and said reference region;
   using the processor to interpret said difference to form a conclusion as to a likely cause of said difference; and
   using the processor to communicate said conclusion as to said likely cause to a user.
2. The method of claim 1, wherein said criteria comprises universal classification criteria applicable to each image slice.
3. The method of claim 1, wherein said criteria comprises slice-specific classification criteria applicable only to one or more but not all of said image slices.
4. The method of claim 1, wherein said comparing step includes an artificial intelligence technique selected from the group consisting of describe-and-match techniques, decision tree techniques, neural net techniques, rule-chaining techniques, ratio pairing techniques, and multisurface pattern separation techniques.
5. The method of claim 1, wherein said communication step further comprises the step of generating a colored image of said difference.
6. The method of claim 1, wherein said communication step comprises the step of generating a textual description of a conclusion.

7. The method of claim 1, wherein said conclusion is a medical diagnosis.

8. The method of claim 1, wherein said combining step comprises the step of adding said derived information together.

9. The method of claim 1, wherein said at least one 2-dimensional region is a structure or an activity level.

10. The method of claim 1, wherein said feature is a size, volume, shape, or intensity.

11. A computer implemented method of performing data analysis, comprising:

inputting at least one input data file describing an object, said object having a plurality of regions;

determining an identity of a known region in said at least one input data file;

comparing features of said known region to features of a reference object in order to determine differences between said known region and said reference object, wherein said known region and said reference object are identified as representing a same type of structure;

generating a conclusion of a cause of said differences between said known region and said reference object; and communicating said differences and said conclusion to a user.

12. The method of claim 11, wherein said features include means pixel intensities of said known region and said reference object.

13. The method of claim 11, wherein said features include volumes of said known region and said reference object.

14. A computer implanted method of performing data analysis, comprising:

inputting at least one input data file describing an object, said object having a plurality of determining an identity of a known region in said at least one input data file;

comparing means pixel intensity of said known region to mean pixel intensity of a reference object in order to determine a difference in mean pixel intensity between said known region and said reference object, wherein said known region and said reference object are identified as representing a same type of structure;

generating a medical conclusion of a cause of said mean pixel intensity difference between said known region and said reference object; and communicating said mean pixel intensity difference and said medical conclusion to a user.

15. A computer implemented method of performing data analysis; comprising:

inputting at least one input data file describing an object, said object having a plurality of regions;

determining an identity of a known region in said at least one input data file;

comparing a volume of said known region to a volume of a reference object in order to determine a difference in volume between said known region and said reference object, wherein said known region and said reference object are identified as representing a same type of structure;

generating a medical conclusion of a caus of said difference in volume between said known region and said reference object, and communicating said difference in volume and said medical conclusion to a user.

* * * * *